United States Patent
Wang et al.

(10) Patent No.: US 8,165,774 B2
(45) Date of Patent: Apr. 24, 2012

(54) CRUISE CONTROL INTERACTION WITH DECELERATION FUEL CUTOFF

(75) Inventors: Lan Wang, Troy, MI (US); Wenbo Wang, Novi, MI (US); Zhong Wang, Westland, MI (US)

(73) Assignee: GM Global Technology Operations LLC

(*) Notice: Subject to any disclaimer, the term of this patent is extended or adjusted under 35 U.S.C. 154(b) by 1098 days.

(21) Appl. No.: 11/759,414

(22) Filed: Jun. 7, 2007

(65) Prior Publication Data

US 2008/0306669 A1   Dec. 11, 2008

(51) Int. Cl.
*B60T 8/32* (2006.01)

(52) U.S. Cl. .......... 701/93; 180/170; 180/178; 180/179; 123/325; 123/350; 123/493; 123/481

(58) Field of Classification Search .............. 701/93–98; 180/170, 178, 179; 123/325, 350, 481, 493
See application file for complete search history.

(56) References Cited

U.S. PATENT DOCUMENTS

| | | | | |
|---|---|---|---|---|
| 4,843,553 A * | 6/1989 | Ohata | | 701/93 |
| 4,984,545 A * | 1/1991 | Kaneyasu et al. | | 123/399 |
| 5,099,941 A * | 3/1992 | Kawano et al. | | 180/179 |
| 5,119,781 A | 6/1992 | Trombley et al. | | |
| 5,646,850 A * | 7/1997 | Ishida et al. | | 701/93 |
| 5,758,306 A * | 5/1998 | Nakamura | | 701/93 |
| 6,347,680 B1 * | 2/2002 | Mianzo et al. | | 180/197 |
| 6,351,702 B1 * | 2/2002 | Tange et al. | | 701/96 |
| 2003/0200021 A1 * | 10/2003 | Aoyama et al. | | 701/93 |

* cited by examiner

*Primary Examiner* — Mark Hellner

(57) ABSTRACT

A vehicle control system includes a sensor that generates a vehicle speed signal. A cruise control system generates a cruise control signal to maintain a vehicle at a target speed. A control module compares the vehicle speed signal to the target speed signal. The control module calculates different cruise control gains to delay changes in throttle position of the cruise control system when the vehicle speed signal is greater than the target speed.

15 Claims, 6 Drawing Sheets

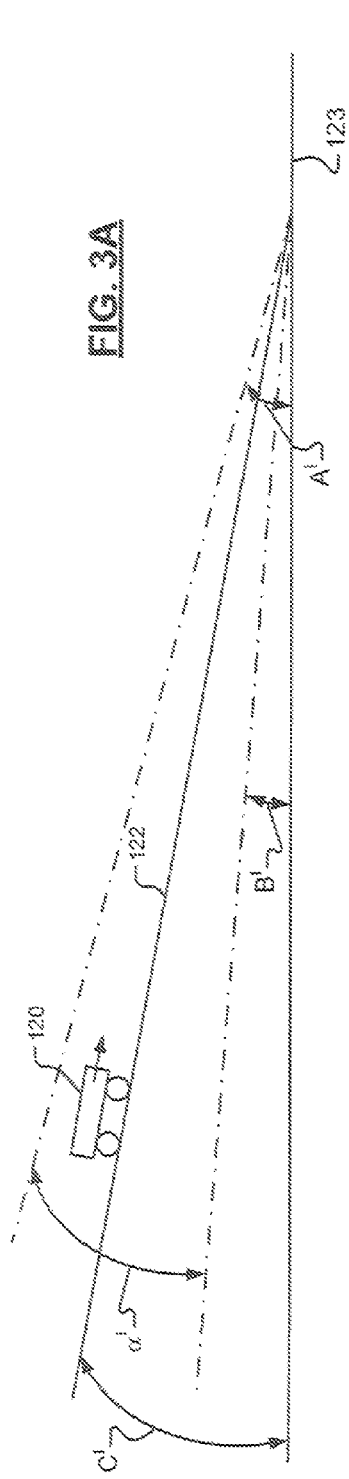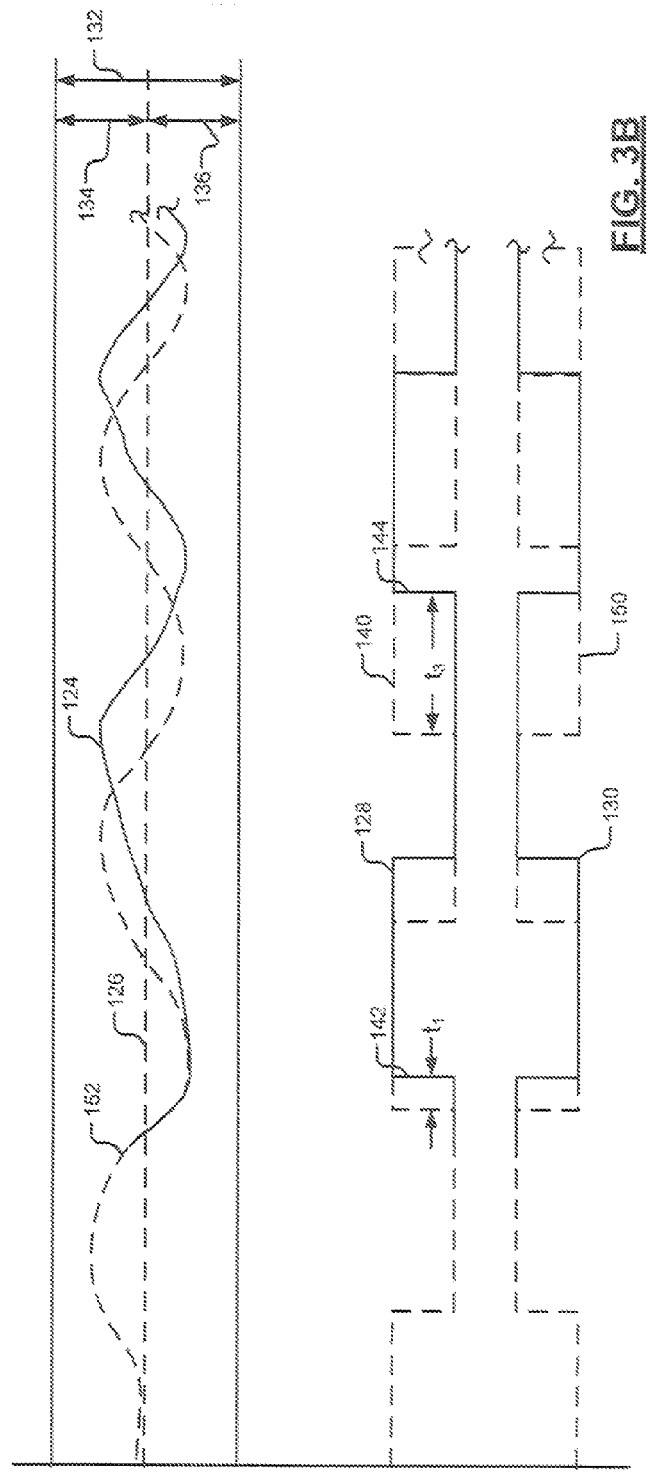

CRUISE CONTROL INTERACTION WITH DECELERATION FUEL CUTOFF

FIELD

The present disclosure relates to vehicle cruise control, throttle control and fuel injection control systems, and more particularly to throttle control during deceleration fuel cutoff modes.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Cruise control and deceleration fuel cut-off (DFCO) systems are incorporated in vehicles. Cruise control systems enable a vehicle to maintain a desired vehicle speed. DFCO systems disable fuel supply to an engine during certain conditions to cut engine power, improve fuel economy and reduce emissions.

In a cruise control system, a controller maintains the vehicle speed through varying road and vehicle conditions. A vehicle operator may set and manipulate a cruise control target speed through depression of an accelerator pedal, a brake pedal, and/or a clutch pedal, as well as via actuation of hand controls.

When a target speed is set, cruise control systems attempt to maintain a current vehicle speed at approximately the target speed. The current vehicle speed may be different than the target vehicle speed due to various vehicle operating conditions. For example, when traveling on inclined road surfaces, the current vehicle speed may be less than or greater than the target speed.

During a DFCO mode, supply of fuel to an engine is interrupted. The DFCO mode is customarily initiated when engine power is not in demand or engine braking is expected. In other words, the DFCO mode is, typically, initiated when the engine is decelerating. This may occur when an engine control element, such as a throttle valve or an accelerator pedal, is positioned for engine idling. The purpose of this mode of operation is to reduce fuel consumption and maximize engine braking induced by drag or negative torque applied by an engine load. The DFCO mode is generally deactivated when either an engine rotational speed decreases below a predetermined minimum speed associated with idling, or the engine control element is moved from the idling position to accelerate engine rotation and increase engine output torque.

When cruise control is engaged when traveling on a declined surface such as when traveling down a hill, vehicle speed may be higher than a target speed. As a result, a cruise control system may request power reduction. When a vehicle is on a steep enough declined surface, a DFCO mode is triggered. However, the vehicle may be decelerated to a speed that is lower than the target speed. This causes the cruise control system to increase air and fuel supply and thus engine power output. When the engine increases its power by opening throttle position more than a low end threshold, the DFCO mode is deactivated. Toggling of the DFCO mode between ON and OFF states, results in frequent and periodic acceleration and deceleration, which causes unsmooth vehicle speed.

SUMMARY

A vehicle control system is provided and includes a sensor that generates a vehicle speed signal. A cruise control system generates a cruise control signal to maintain a vehicle at a target speed. A control module compares the vehicle speed signal to the target speed signal. The control module calculates different cruise control gains to delay changes in throttle position of the cruise control system when the vehicle speed signal is greater than the target speed.

In another feature, a method of operating a vehicle control system is provided and includes generating a vehicle operator throttle input signal. A vehicle speed signal is generated. The vehicle speed signal is compared to a target speed and a first difference signal is generated. Throttle intrusive cruise control is enabled when the first difference signal is greater than a first predetermined value. Cruise control operation is adjusted and different cruise control gains are calculated to delay throttle states of a cruise control signal based on said throttle intrusive cruise control.

In still another feature, a vehicle control system is provided and includes a cruise control system that maintains a vehicle at a target speed. A sensor generates a throttle position signal. A control module generates a fuel signal. The control module enables throttle intrusive cruise control to modify a cruise control command signal when the throttle position signal indicates that a throttle is in an idle position and the fuel signal indicates a decrease in fuel supply to an engine.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 3A is a side view illustrating a vehicle traveling on a declined surface and incorporating a cruise control system in accordance with an embodiment of the present disclosure;

FIG. 3B is a signal plot for a vehicle control system operating according to an embodiment of the present disclosure and in association with the declined surface of FIG. 3A;

DETAILED DESCRIPTION

Figure 1:
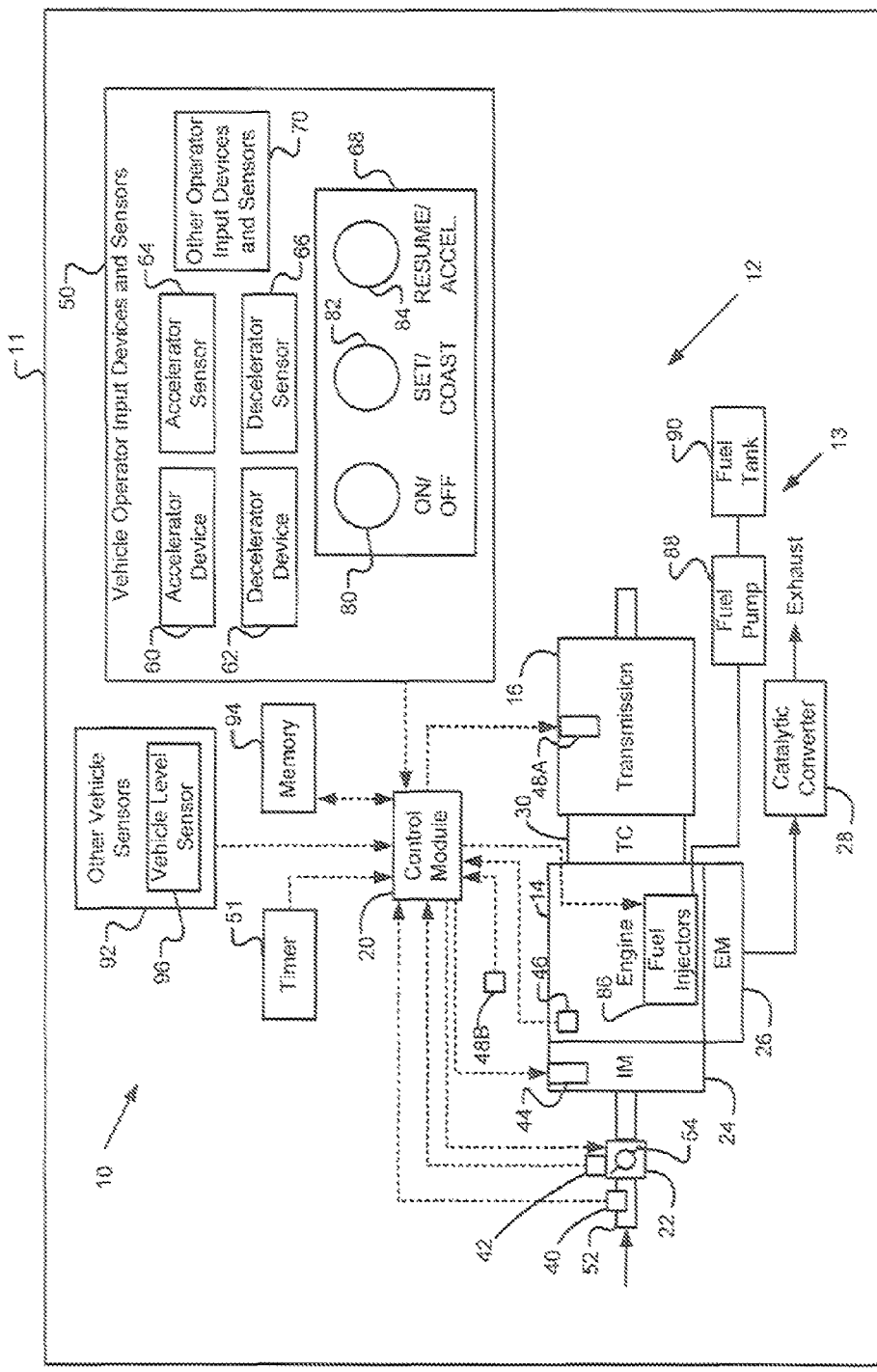
FIG. 1 is a functional block diagram of a vehicle control system incorporating an exemplary cruise control and deceleration fuel cutoff (DFCO) systems in accordance with an embodiment of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Referring to FIG. 1, a functional block diagram of a vehicle control system incorporating an exemplary cruise control system is shown.

Referring now to FIG. 1, a functional block diagram of a vehicle system 10 of a vehicle 11 incorporating an exemplary cruise control system 12 and deceleration fuel cutoff (DFCO) system 13 is shown. The vehicle system 10 includes an engine 14 that drives a transmission 16 through a coupling device 30. The cruise control system 12 includes a control module 20 that regulates the operation of the engine 14 and a transmission 16 based on various vehicle operating parameters. The cruise control system 12 has an active state and an inactive state. The active state refers to when the cruise control system 12 is ON, a cruise control target speed is set, and the cruise control system 12 is actively attempting to maintain the vehicle 11 traveling at the target speed. The deactive state refers to when the cruise control system 12 is ON and is not actively maintaining the vehicle 11 at the target speed. A target speed may be set when the cruise control system 12 is deactive. When the cruise control system 12 is in the active state, the control module 20, adjusts transitional timing of cruise control command signals based on road surface conditions, such as, for example, a down hill or declined road surface condition. This is described in detail below.

A cruise control command signal refers to a signal generated by a vehicle control system to maintain the set target speed and may be associated with the position of a throttle, the torque of an engine, or some other target speed maintaining parameter. The cruise control command signal may be directly proportional to the target speed.

In use, the vehicle system 10 draws air through a throttle 22 into an intake manifold 24, which distributes air to cylinders of the engine 14. The air is mixed with fuel at a desired air-to-fuel (A/F) ratio and the A/F mixture is combusted within the cylinders to generate drive torque. The combustion products are exhausted from the engine 14 through an exhaust manifold 26 and are treated in a catalytic converter 28 before being released to atmosphere.

In the case of an automatic transmission, a coupling device 30 between the engine 14 and the transmission 16 may be a torque converter that includes a torque converter clutch (TCC). The TCC is operable in an unlocked mode (i.e., released) to multiply torque transferred from the engine 14 to the transmission 16 and a locked mode to enable direct torque transfer from the engine 14 to the transmission 16. More specifically, in the unlocked mode, the torque converter provides a fluid coupling between engine output and transmission input shafts. In the locked mode, the TCC couples the engine output and the transmission input shafts for common rotation. In the case of a manual transmission, the coupling device 30 may be a clutch that is manually actuated by a vehicle operator to selectively uncouple the engine output and the transmission input shafts from common rotation.

The cruise control system 12 in addition to the control module 20 also includes vehicle sensors, such as a mass air flow (MAF) sensor 40, a throttle position sensor 42, a manifold absolute pressure (MAP) sensor 44, an engine RPM sensor 46, vehicle speed sensors 48, and vehicle operator input devices and sensors 50. The cruise control system 12 also includes a calibration timer 51.

The MAF sensor 40 is coupled to an air intake 52 and generates an MAF signal that is indicative of air flow. The throttle position sensor 42 generates a throttle position signal that is indicative of position of a throttle plate 54 of the throttle 22, which is controlled via one of the vehicle operator input devices 50, such as an accelerator pedal. The MAP sensor 44 generates a MAP signal indicative of pressure within the intake manifold 24. The vehicle speed sensors 48 may generate an RPM signal indicative of the rotational velocity of a crankshaft of the engine 14. The vehicle speed sensors 48 may include a transmission mounted sensor 48A and/or some other vehicle speed sensor 48B, such as an ABS sensor that is responsive to the rotation of a wheel. The vehicle speed sensors 48 or the control module 20, based on output signals therefrom, generate a current vehicle speed signal $V_{VEH}$ indicative of a current measured vehicle speed. It is also anticipated that a vehicle acceleration sensor may be included to monitor vehicle acceleration ($a_{VEH}$). Alternatively, the control module 20 may calculate vehicle acceleration $a_{VEH}$ based on other sensed operating conditions.

The control module 20 electronically controls a position of the throttle plate 54 to regulate air flow into the engine 14. The control module 20 also regulates operation of the engine 14 in a cruise control mode (e.g., adaptive or standard) based on an operator input. More specifically, when the operator engages cruise control (i.e., ON), the control module 20 regulates operation of the engine 14 and the transmission 16 to maintain the target speed. During cruise and in the case of an automatic transmission, the control module 20 regulates transmission gear shifts and TCC mode based on the vehicle operating conditions. More specifically, shifts may be determined using a pre-programmed shift map or table based on throttle position and the vehicle speed signal $V_{VEH}$.

The throttle control evaluates vehicle operating parameters to determine whether a shift (e.g., downshift) is required. The vehicle operating parameters may include vehicle speed error $V_{ERR}$, vehicle acceleration $a_{VEH}$, MAP, engine torque reserve and performance enrichment onset. Engine torque reserve is defined as the amount of available engine torque above that which is being provided to vehicle wheels, for a given gear ratio.

In the case of a manual transmission, the throttle control does not induce or inhibit shifting of the transmission 16. Instead, the cruise throttle control initiates a shift indicator that is visual, audible or both, and which advises the vehicle operator that a shift should be performed.

The control module 20 may have a central processing unit, memory (RAM and/or ROM), and associated input and output buses or be of some other module form. The control module 20 may be a portion of a central vehicle main control unit, an interactive vehicle dynamics module, a power control module, an ignition controller, an engine control module (ECM), a transmission control module (TCM), a control circuit having a power supply, combined into a single integrated controller, or may be a stand-alone controller as shown.

The vehicle operator input devices and sensors 50 include one or more acceleration devices 60 and deceleration devices 62, such as an accelerator pedal and a brake pedal. The acceleration and deceleration devices 60, 62 may include corresponding acceleration and deceleration sensors 64, 66, such as an acceleration pedal position sensor or a brake pedal position sensor. The vehicle operator input devices and sensors 50 include a cruise control interface 68, as well as other operator input devices and sensors 70.

The cruise control interface 68 includes an ON/OFF control device 80, a SET/COAST control device 82 and a RESUME/ACCELERATE control device 84. The control devices 80, 82, 84 may be in the form of switches, buttons, sliders, or may be in some other form. The control devices 80, 82, 84 may provide control signals that are either HIGH or LOW. For example, when OFF, the control signal of the ON/OFF device 80 is LOW (i.e., 0) and when ON the ON/OFF device 80 signal is HIGH (i.e., 1). Similarly, the control signals of the SET/COAST device 82 and the RESUME/ACCELERATE device 84 are normally LOW (i.e., 0), and are HIGH (i.e., 1) when actuated or depressed.

The ON/OFF device 80 enables a vehicle operator to power the cruise control system 12. The SET/COAST device 82 enables the vehicle operator to set a target speed in memory ($S_{MEM}$) or coast while the cruise control system 12 is ON. By tapping the SET/COAST device 82 the vehicle operator sets the target speed $S_{MEM}$ at a current vehicle speed. By holding the SET/COAST device 82 in an ON position, the vehicle coasts.

The RESUME/ACCELERATE device 84 enables a vehicle operator to resume at the target speed $S_{MEM}$ from another speed or accelerate the vehicle from the target speed $S_{MEM}$ while operating with the cruise control system 12 in an ON state. For example, the cruise control system 12 is ON and the vehicle operator depresses a brake pedal thus, placing the cruise control system 12 in the deactive state. The RESUME/ACCELERATE device 84 enables the vehicle operator to activate the cruise control system 12 and to accelerate to and regulate vehicle operation to maintain the previous target speed $S_{MEM}$. When the cruise control system 12 is active, the vehicle operator may hold the RESUME/ACCELERATE device 84 depressed to accelerate the vehicle 11 from the target speed $S_{MEM}$. Additionally, the vehicle operator may tap the RESUME/ACCELERATE device 84 to increase the target speed $S_{MEM}$ by 1 mph or the SET/COAST device 82 to decrease the target speed $S_{MEM}$ by 1 mph. Other cruise control system operating modes are described below.

The DFCO system 13 includes the control module 20, as well as fuel injectors 86, a fuel pump 88, and a fuel tank 90. When activated, the DFCO system deactivated the fuel injection through the fuel injectors 86. Fuel cut-off and resumption speeds may be variable, depending on coolant temperature, A/C clutch status and starter (STA) signal. When extra engine loads are present, the control module 20 begins fuel injection earlier.

The vehicle system 10 may also include other vehicle sensors 92 and memory 94, which may be part of the cruise control and DFCO systems 12, 13. The vehicle sensors 92 may include a vehicle level sensor 96, such as a magnetic sensor, an angular rate sensor, a mercury switch, a gyro, or other angle determination sensor.

Figure 2A:
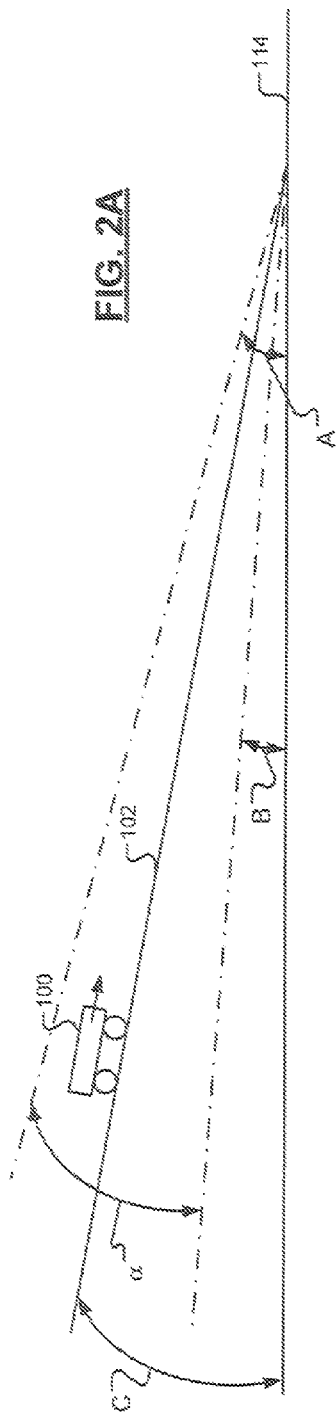
FIG. 2A is a side view illustrating a vehicle traveling on a declined surface and illustrating surface inclination angles according to an embodiment of the present disclosure.
Figure 2B:
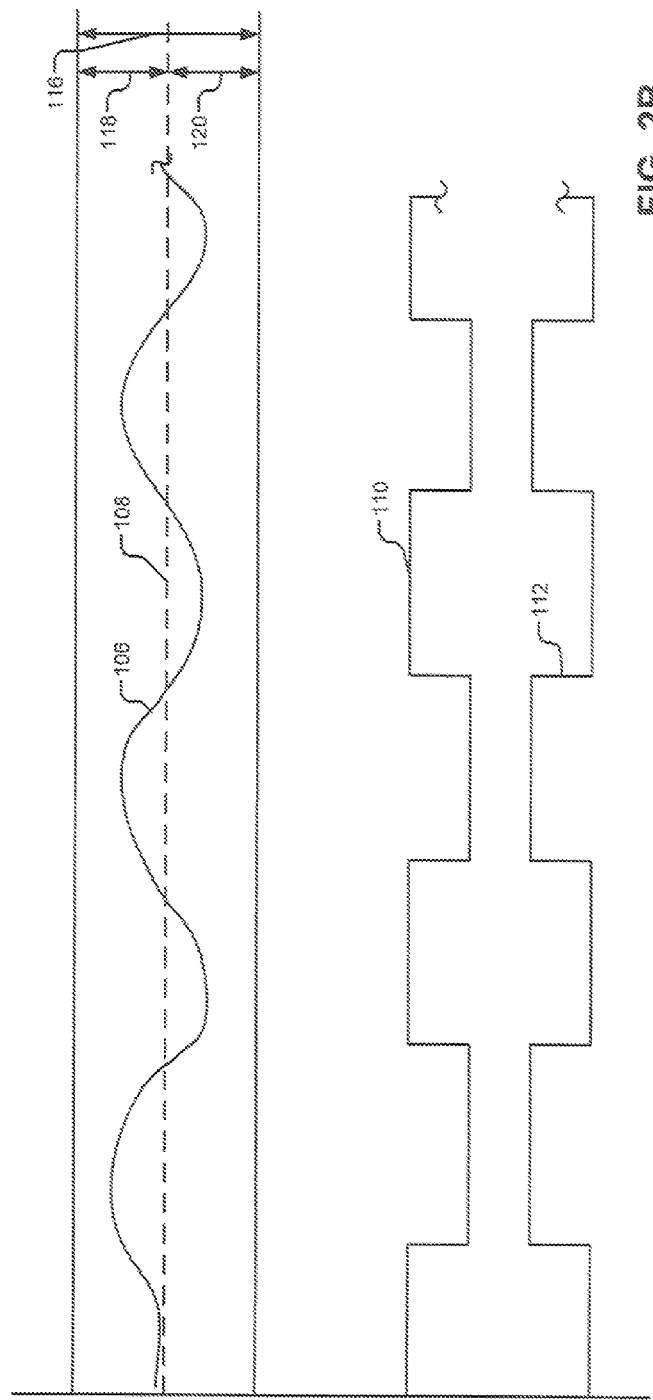
FIG. 2B is a signal plot for a vehicle control system operating in a traditional manner and as a result of the declined surface of FIG. 2A.

Referring to FIGS. 2A-B, a side view illustrating a vehicle 100 traveling on a declined surface 102 and a signal plot are shown for a cruise control system operating in a traditional manner and as a result of the declined surface 102. The signal plot includes a vehicle speed signal plot 106, a target speed plot 108, a throttle opening signal plot 110, and a DFCO signal plot 112, which are shown versus time.

FIG. 2A, illustrates a maximum angle A, a minimum angle B, a current road surface angle C, and a range angle α between angles A and B, which are stored or generated in accordance with an embodiment of the present disclosure. Angles A, B and C are in general based on and relative to a level surface 114. Angles A and B may be predetermined angles, which may be stored in the memory 94. The values of angles A and B may vary based on vehicle weight, vehicle speed, road friction/conditions, etc. The angles A and B may be stored in a memory 94. Angles A & B may be determined using, for example, the method of FIG. 6.

Angle A represents a steep incline limit. When the angle C of a current road surface 102 is approximately greater than angle A then vehicle deceleration due to activation of the DFCO system is limited. Angle B represents a mild incline. When angle C of a current road surface 102 is approximately less than angle B, then the DFCO system 13 is typically deactivated since regular cruise control operation is able to reduce the vehicle speed. Angle α identifies the range of road surface angles in which the interaction between cruise control and DFCO occurs, during regular cruise control operation, without vehicle operator interruptions. Thus, embodiments described below address the stated interaction.

FIG. 2B, illustrates cruise control operation using traditional target speed tracking techniques. The current vehicle speed 106 is maintained at approximately the target speed 108 and within a window 116. The window 116 has an upper portion 118 and a lower portion 120, which may, for example represent ±5 mph. An up/down hill condition may cause the vehicle speed to be outside the window. One or more of the disclosed embodiments herein are directed to down hill scenarios when vehicle speed may be significantly higher than a cruise control target speed.

FIG. 2B, also illustrates toggling of the throttle opening signal 110 and the DFCO signal 112. As the current vehicle speed 106 increases and becomes greater than the target speed 108, the throttle opening signal 110 is switched from an OPEN state to a CLOSED state. Similarly, when the current vehicle speed 106 decreases and becomes less than the target speed 108, the throttle opening signal 110 is switched from the CLOSED state to the OPEN state. When the throttle opening signal 110 is in the OPEN state, the DFCO signal 112 is in an OFF state. When the throttle opening signal 110 is in the CLOSED state, the DFCO signal 112 is in an ON state. When the DFCO signal 112 is in the OFF state fuel is permitted to flow to an engine. When the DFCO signal 112 is in the ON state fuel is not permitted to flow to the engine. This frequent toggling of the DFCO signal 112 causes an unsmooth vehicle speed over time.

Referring to FIGS. 3A-B, a side view illustrating a vehicle 120 traveling on a declined surface 122 and incorporating the cruise control system 12 and a signal plot are shown according to an embodiment of the present disclosure. The signal plot includes a vehicle speed signal plot 124, a target speed plot 126, a cruise control signal plot 128, and a DFCO signal plot 130, which are shown versus time.

FIG. 3A illustrates a maximum angle A', a minimum angle B', a current road surface angle C', and a range angle α', which may be approximately the same as angles A, B. C and a. The angles A', B', α' may be stored or generated in accordance with an embodiment of the present disclosure. Angles A', B' may be predetermined angles, which may be stored in the memory 94. Angles A' and B' may vary based on vehicle weight, vehicle speed, and road friction/conditions, etc. Angles A' and B' may be stored in a memory 94. Angles A' & B' may be determined via the method of FIG. 6.

Angle A', like angle A, represents a steep incline limit. When the angle C' of a current road surface 122 relative to a level surface 123 is approximately greater than angle A' then vehicle deceleration due to activation of the DFCO system 13 is limited. Angle B', like angle B, represents a mild incline. When the angle C' of a current road surface 122 relative to a level surface 123 is approximately less than angle B', then the DFCO system 13 is always deactivated. When angle C' is between angles A' and B', interaction between regular cruise control and operation of the DFCO occurs for regular cruise control without vehicle operator interruptions. This is also addressed in accordance with the embodiments of the present disclosure.

FIG. 3B, illustrates cruise control operation using traditional target speed tracking techniques. The current vehicle speed 124 is maintained at approximately the target speed 126 and within a window 132. The window 132 has an upper portion 134 and a lower portion 136, which may, for example represent ±5 mph.

FIG. 3B, also illustrates transitional states of a cruise control signal 128 and a DFCO signal 130. For the embodiment of FIG. 3B, the cruise control signal 128 is shown as a throttle opening signal. Although, the cruise control signal 128 and DFCO signal 130 are shown as being toggled between OPEN and CLOSED states and ON and OFF states, smoother transitions may be performed. For example, the cruise control signal 128 and the DFCO signal 130 may be ramped up or down when transitioning between states. The CLOSED state may refer to approximately a throttle idle position, a throttle fully closed position, or a position therebetween.

For the example shown, as the current vehicle speed 124 decreases and becomes less than the target speed 126, the control module 20 delays the switching of the cruise control signal 128 from the CLOSED state to the OPEN state. A first dashed line 140 represents a cruise control/throttle opening signal without delay. A first delayed toggled transition 142 of the cruise control signal 128 is delayed by time $t_1$. Similarly, when the vehicle speed signal 124 increases and becomes greater than the target speed 126, the cruise control signal 128 may be delayed and switched from the OPEN state to the CLOSED state. When the throttle opening signal is in the OPEN state, the DFCO signal 130 is in an OFF state. When the cruise control signal 128 is in the CLOSED state, the DFCO signal 130 is in an ON state. When the DFCO signal 130 is in the OFF state fuel is permitted to flow to an engine, such as the engine 14. When the DFCO signal 130 is in the ON state fuel is not permitted to flow to the engine.

As an example, when the same amount of delay is used for each transition of the cruise control signal 128 then the delay between transitions increases over time. In the example embodiment, a third transition 144 is shown and has delay $t_3$, which is equal to three times $t_1$ or $3t_1$. Note a different amount of delay may be used for each transition. Although it may appear that t3 is three times t1, t3 corresponds to accumulated delay times over three events. Each transition may have the same or similar delay. Proportional integral derivative (PID) gains are adjusted to slow down the ON/OFF toggling for DFCO, which delays the vehicle speed transition.

The delayed transitioning of the cruise control signal 128 delays the transitioning response of the DFCO signal 130 and alters the resultant vehicle speed. A second dashed line 150 represents a DFCO signal without delay. A third dashed line 152 represents the vehicle speed without delayed transitions of cruise control and DFCO signals. The delayed transitioning of the cruise control signal 128 and the DFCO signal 130 reduces the periodic frequency of acceleration and deceleration of the vehicle speed 124.

Figure 4:
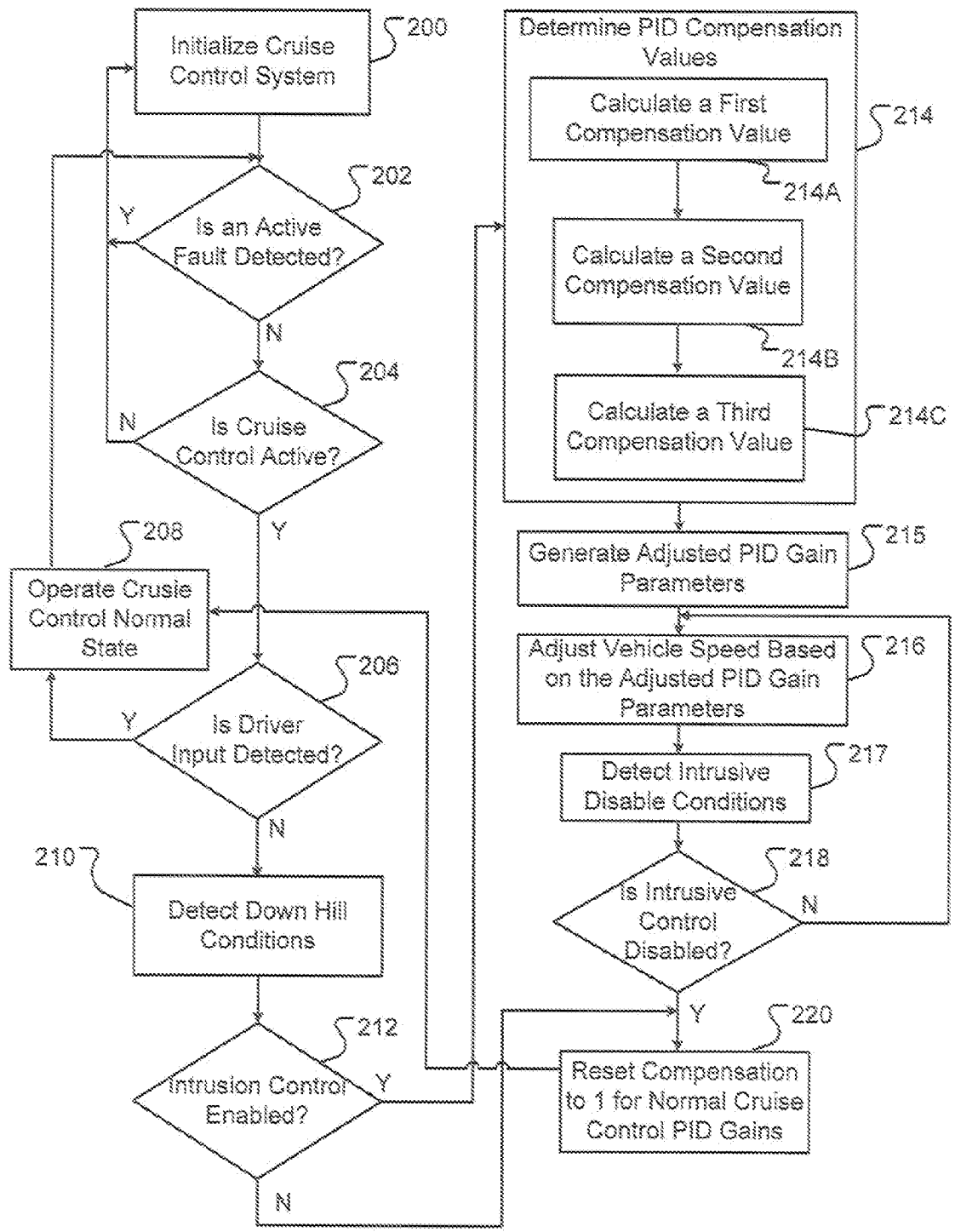
FIG. 4 is a logic flow diagram illustrating a method of operating a vehicle control system in accordance with an embodiment of the present disclosure.

Referring now to FIG. 4, a logic flow diagram illustrating a method of operating a vehicle control system is shown. Although the following steps are described primarily with respect to the embodiment of FIG. 1, the steps may be easily modified to be applied to other embodiments of the present invention.

In step 200, the cruise control system 12 is initialized. The cruise control ON/OFF switch 80 may be switched to an ON state. In step 202, the control module 20 determines whether an active system fault exists. When no fault exists, step 204 is performed, otherwise the control module 20 returns to step 200. In step 204, the control module 20 determines whether the cruise control system 12 is active. A cruise control engagement signal may be generated that is indicative of an engaged state. When initialized and active, the cruise control system 12 operates in a normal state. When the control module 20 is active, step 206 is performed, otherwise step 200 is performed.

In step 206, the control module 20 determines whether a vehicle operator input is received. The vehicle operator input may be in the form of a request command signal and/or a set command signal. A vehicle operator input may be, for example, from any of the input devices 50. When a vehicle operator input has been received, step 208 is performed, otherwise step 210 is performed.

In step 208, the cruise control system 12 operates in the normal state. While in the normal state, the cruise control system 12 maintains a current vehicle speed V(t) at a set target speed S, with vehicle operator inputs or interruptions.

Figure 5:
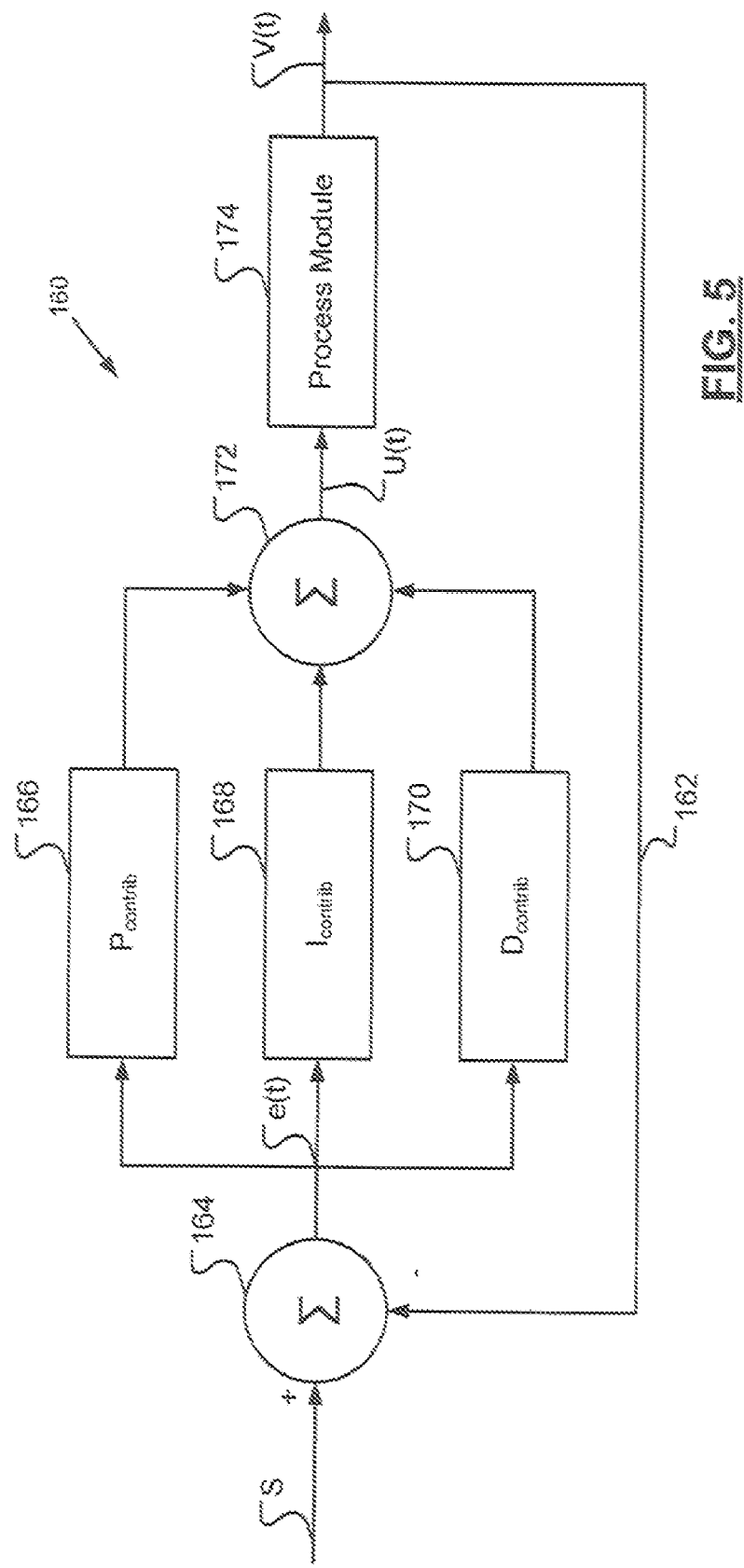
FIG. 5 is a sample functional block and signal flow diagram of a proportional integral derivative (PID) cruise control system is shown

Referring now also to FIG. 5, a sample functional block and signal flow diagram of a PID cruise control system 160 is shown. The PID cruise control system 160 includes a setpoint, which may be equal to the target speed S. The PID cruise control system 160 also includes a feedback loop 162. The current vehicle speed V(t) is feedback and subtracted, via a first summer 164, to provide an error signal e(t), as provided by equation 1.

$$e(t)=S-V(t) \qquad (1)$$

The current vehicle speed V(t) is a function of cruise control command signal U(t). The cruise control signal U(t) is based on a proportional contribution $P_{contrib}$ generated by a proportional module 166, an integral contribution $I_{contrib}$ generated by an integral module 168 and a derivative contribution $D_{contrib}$ generated by a derivative module 170. The contributions $P_{contrib}$, $I_{contrib}$, $D_{contrib}$ are summed together to provide a cruise control signal U(t), via a second summer 172, and are based on the error signal e(t), as provided by equation 2. The summers 164, 172 and the contributions $P_{contrib}$, $I_{contrib}$, $D_{contrib}$ modules 166-170 may be included as part of or accessible by the control module 20.

$$U(t)=P_{contrib}+I_{contrib}+D_{contrib} \qquad (2)$$

The contributions $P_{contrib}$, $I_{contrib}$, $D_{contrib}$ are provided by equations 3-5, where $K_p$, $T_i$, and $T_d$ are a proportional PID gain factor constant, an integral time constant, and a derivative time constant, respectively, that are used to tune the PID cruise control system 160.

$$P_{contrib} = K_p e(t) \quad (3)$$

$$I_{contrib} = \frac{K_p}{T_i} \int_0^t e(\tau) d(\tau) \quad (4)$$

$$D_{contrib} = K_p T_d \frac{de}{dt} \quad (5)$$

The sum of the contributions $P_{contrib}$, $I_{contrib}$, $D_{contrib}$ is provided to a process module 174. The process module 174 may represent and include, for example, a throttle control module, such as the control module 20, which generates a throttle control signal. The process module 174 may further include a throttle, such as the throttle 22, which receives a throttle control signal. Throttle position may be adjusted based on the cruise control signal U(t), which affects the current vehicle speed V(t). The cruise control signal U(t) may be represented in standard form, as provided by equation 6. The cruise control signal U(t) may be represented in a parallel form with the constants $$K_p, \frac{K_p}{T_i},$$

and $K_p T_d$ replaced with regular cruise control calibration PID gain parameters $k_p$, $k_i$, and $k_d$, as provided by equation 7.

$$U(t) = K_p \left( e(t) + \frac{1}{T_i} \int_0^t e(\tau) d(\tau) + T_d \frac{de}{dt} \right) \quad (6)$$

$$U(t) = k_p e(t) + k_i \int_0^t e(\tau) d(\tau) + k_d \frac{de}{dt} \quad (7)$$

The gain parameters $k_p$, $k_i$, and $k_d$ are provided by equations 8-10.

$$k_p = K_p \quad (8)$$

$$k_i = \frac{K_p}{T_i} \quad (9)$$

$$k_d = K_p T_d \quad (10)$$

In step 210, the control module 20 detects down hill conditions.

Figures 6, 7:
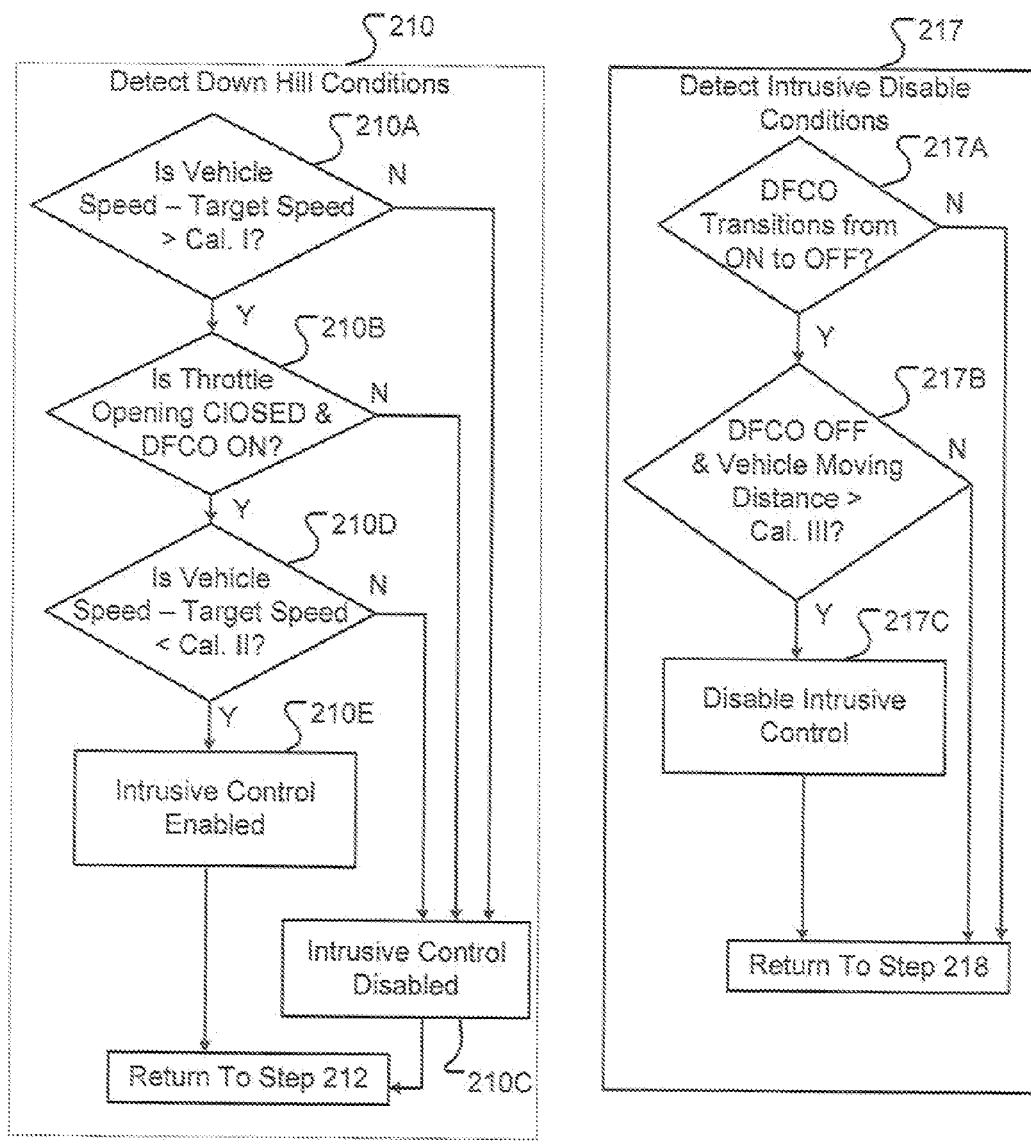
FIG. 6 is a logic flow diagram illustrating a method of detecting declined surface operating conditions in accordance with an embodiment of the present disclosure.
FIG. 7 is a logic flow diagram illustrating a method of detecting intrusive disable conditions in accordance with an embodiment of the present disclosure.

Referring now also to FIG. 6, a logic flow diagram illustrating a method of detecting declined surface operating conditions is shown. In step 210A, the control module 20 receives and compares a first vehicle speed signal to the target speed S to determine if the vehicle 11 is traveling on or above a mild declined surface. The target speed S is subtracted from the first vehicle speed signal to generate a first difference signal. When the first difference signal is greater than a first predetermined difference value I, the control module 20 performs step 210B, otherwise step 210C is performed. The first difference value I may be related to and/or associated with a minimum angle limit B, such as the angle limit, or used to determine if the vehicle is traveling on or above a mild declined surface. When the surface is not steeper than a surface at angle B, vehicle speed may not be significantly less than the target speed, and DFCO is OFF.

In step 210B, when a cruise control/throttle opening signal is in a CLOSED state and a DFCO signal is in an ON state, step 210D is performed, otherwise step 210C is performed.

In step 210C, intrusive cruise control is maintained in a disabled state. Upon completion of step 210C, step 212 is performed.

In step 210D, the control module 20 receives and compares a second vehicle speed signal to the target speed S to determine if the vehicle is traveling on or below a steep declined surface. The target speed S is subtracted from the second vehicle speed signal to generate a second difference signal. When the second difference signal is less than a second predetermined value II then step 210E is performed, otherwise step 210C is performed. The second difference value II may be related to and/or associated with a maximum angle limit, such as the maximum angle limit A. When the surface is steeper than a surface at angle A, the vehicle speed may be high after DFCO is ON and the vehicle operator may take actions to adjust the vehicle speed.

In step 210E, intrusive cruise control is enabled. Upon completion of step 210E, step 212 is performed.

In step 212, the control module 20 determines whether intrusive cruise control operation is enabled. When intrusive cruise control operation is enabled, step 214 is performed, otherwise step 220 is performed.

In step 214, the control module 20 determines compensation values for adjusted PID gain parameters $k_p'$, $k_i'$, $k_d'$. In step 214A, a first calibration value $C_p$ is determined. In step 214B, a second calibration value $C_i$ is determined. In step 214C, a third calibration value $C_d$ is determined. The compensation values $C_p$, $C_i$, $C_d$ are proportionally generated based on a current declined surface angle. The declined surface angle may be indirectly determined based on the current vehicle speed and the target speed S or directly from the level sensor 96. The compensation values $C_p$, $C_i$, $C_d$ may be determined and based vehicle parameters, such as a current throttle position, an engine speed, or other vehicle parameters.

In step 215, the adjusted PID gain parameters $k_p'$, $k_i'$, $k_d'$ are generated. The compensation values $C_p$, $C_i$, $C_d$ are multiplied by the respective gain factors $k_p$, $k_i$, $k_d$ as shown by equations 11-13. The adjusted PID gain parameters $k_p'$, $k_i'$, $k_d'$ may be provided to or generated within the process module 174.

$$k_p' = K_p C_p \quad (11)$$

$$k_i' = \frac{K_p C_i}{T_i} \quad (12)$$

$$k_d' = K_p T_d C_d \quad (13)$$

In step 216, the current vehicle speed V(t) is adjusted as a function of cruise control command signal U(t) based on the adjusted gain parameters $k_p'$, $k_i'$, $k_d'$. The updated cruise control command signal U'(t) may be represented as provided by equation 14.

$$U'(t) = k_p' e(t) + k_i' \int_0^t e(\tau) d\tau + k_d' \frac{de}{dt} \quad (14)$$

Referring now also to FIG. 7, a logic flow diagram illustrating a method of detecting intrusive disable conditions is shown. In step 217A, the control module 20 checks whether the DFCO signal transitions from the ON state to the OFF state. When the DFCO signal transitions from the ON state to the OFF state step 217B is performed, otherwise step 218 is performed.

In step 217B, when the DFCO signal is in the OFF state and vehicle distance traveled while in the OFF state is greater than a third predetermined value III, step 217C is performed, otherwise step 218 is performed. In step 217C, intrusive cruise control is disabled. Upon completion of step 217C, step 218 is performed.

In step 218, the control module 20 checks whether intrusive cruise control is disabled. When intrusive cruise control is disabled step 220 is performed, otherwise control loops back to step 216. In step 220, the compensation values $C_p$, $C_i$, $C_d$ are reset to equal one (1) for normal cruise control PID gain operation. The reset may be rate-limited for smooth transition. Upon completion of step 220, the control module 20 performs step 208.

The above-described steps are meant to be illustrative examples; the steps may be performed sequentially, synchronously, simultaneously, or in a different order depending upon the application.

Referring again to FIG. 1, the cruise control system 12 may also operate in any of the following different modes including: disabled, standby disabled, standby enabled, engaged, resume, overspeed resume, accelerate from engaged, accelerate from standby enabled, coast, tap-up and tap-down. Resume, overspeed resume, accelerate from engaged, accelerate from standby, engaged, coast, tap-up and tap-down modes are transient modes.

In the disabled mode, the ON/OFF switch 80 is in the OFF state, cruise control is non-operative and the target speed $S_{MEM}$ is cleared. In the standby disabled mode, cruise control exits the disabled mode when the ON/OFF switch 80 is in the ON state and the brake before cruise security feature is met. The brake before cruise security feature ensures brake inputs are read into the PI control properly. In the standby enabled mode, the ON/OFF switch 80 is in the ON state and the set/coast and resume/accelerate signals are zero.

The cruise control transitions from the standby enabled mode to the engaged mode on the failing edge of a set/coast signal. In other words, the cruise control enters the engaged mode from any transient mode (i.e. resume, overspeed resume, accelerate from engaged, accelerate from standby enabled, coast, tap-up or tap-down) on the failing edge of the set/coast or resume/accelerate signals. In the engaged mode, the PI control maintains the vehicle speed $S_{VEH}$ at the target speed $S_{MEM}$. When entering engaged mode from standby enabled, accelerate from engaged, coast or accelerate from standby enabled modes, the target speed $S_{MEM}$ is set equal to the vehicle speed $S_{VEH}$.

In the resume mode, the PI control resumes (i.e. accelerates to) the last target speed $S_{MEM}$. From the accelerate mode or from the standby enabled mode, the resume mode is entered if a timer is less than a resume to accelerate transition time ($T_{RESACC}$) and the vehicle speed $S_{VEH}$ is less than the target speed $S_{MEM}$ (i.e., an underspeed condition). From overspeed resume mode, the resume mode is entered if the timer is greater than or equal to $T_{RESACC}$ and the failing edge of the resume/accelerate signal occurs. Alternatively, the resume mode is entered from the overspeed resume mode if the timer is less than $T_{RESACC}$, the failing edge of the resume/accelerate signal occurs and the vehicle speed $S_{VEH}$ is less than the target speed $S_{MEM}$.

In the overspeed resume mode, the PI control decelerates the vehicle to the last target speed $S_{MEM}$. The overspeed resume mode is entered from the standby enabled mode on the failing edge of the resume/accelerate signal when $S_{ERROR}$ is greater than a maximum allotted error ($E_{MAX}$) for cruise control to go into the accelerate from standby enabled mode.

The accelerate from engaged mode is entered into when the RESUME/ACCELERATE switch 84 is depressed and a timer is greater than a tap-up to acceleration time threshold ($T_{TAPUPTRANS}$). In the accelerate from engaged mode, the PI control accelerates the vehicle until the resume/accelerate switch 84 is released. The accelerate from engaged mode does not affect the target speed $S_{MEM}$.

In the accelerate from standby enabled mode, the PI control remains in this mode until the RESUME/ACCELERATE switch 84 is released. Once the resume/accelerate switch 84 is released the PI control enters the resume mode and accelerates the vehicle until the target speed $S_{MEM}$ is achieved. The accelerate from standby mode is entered on the rising edge of the resume/accelerate switch signal if the $S_{ERROR}$ is less than a maximum error ($S_{ERRORMAX}$). The accelerate from standby enabled mode does not affect $S_{MEM}$.

The coast mode is entered into from the resume mode on the failing edge of the set/coast switch signal. The coast mode is entered into from the tap-down mode if the set/coast signal is high and a timer is greater than a tap-down to coast transition time threshold ($T_{TAPDWNCST}$). In the coast mode, the throttle area is reduced and the vehicle decelerates until the set/coast switch is released. The coast mode does not affect the target speed $S_{MEM}$.

The tap-up mode increases the vehicle speed by 1 mph. The tap-up mode is entered from the overspeed resume, tap-down, accelerate from engaged, tap-up, engaged or coast modes if the rising edge of the RESUME/ACCELERATE switch 84 signal occurs. The PI control also increments the target speed $S_{MEM}$ by one mph. Conversely, the tap-down mode decreases the vehicle speed by 1 mph. The tap-down mode is entered from the tap-down, tap-up, engaged, accelerate from engaged or accelerate from standby enabled modes if the rising edge of the set/coast switch signal occurs. The PI control also decrements the target speed $S_{MEM}$ by one mph. The tap-up and tap-down modes occur in 1 second increments. Upon the expiration of 1 second after the corresponding switch has been tapped, the cruise control mode goes back to engaged with the target speed $S_{MEM} \pm 1$ mph.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A vehicle control system comprising:
   a sensor configured to generate a vehicle speed signal;
   a cruise control system configured to generate a cruise control command signal to maintain a vehicle at a target speed; and
   a control module configured to:
      compare said vehicle speed signal to said target speed;
      calculate different cruise control gains; and
      delay changes in a throttle position associated with said cruise control command signal (i) based on said different cruise control gains and (ii) when said vehicle speed signal is greater than said target speed; wherein said control module is configured to compare said vehicle speed signal to said target speed and generate a first difference signal;
      enable throttle intrusive cruise control when said first difference signal is greater than a first predetermined value; and adjust cruise control operation, calculate said different cruise control gains, and delay different throttle states of said cruise control command signal, based on said throttle intrusive cruise control.

2. The vehicle control system of claim 1 comprising a fuel cutoff system configured to generate a fuel signal to reduce fuel supply to an engine,
wherein said control module is configured to adjust a length of a period between different fuel reduction states of said fuel signal based on said delay.

3. The vehicle control system of claim 1 wherein:
said different cruise control gains include proportional integral derivative (PID) gains; and
said control module is configured to:
calculate compensation values for said PID gains; and
increase said delay based on said compensation values.

4. The vehicle control system of claim 3 wherein said control module is configured to calculate said compensation values based on said vehicle speed and said target speed.

5. The vehicle control system of claim 1 wherein:
said different cruise control gains include proportional integral derivative (PID) gains; and
said control module is configured to calculate compensation values and adjust said PID gains of said cruise control system based on said compensation values.

6. The vehicle control system of claim 1 wherein said control module is configured to increase said delay between HIGH and LOW states of a throttle.

7. The vehicle control system of claim 1 wherein said control module is configured to perform a second comparison between said vehicle speed signal and said target speed and generate a difference signal, and
wherein said control module is configured to enable throttle intrusive control when said difference signal is less than a predetermined value.

8. The vehicle control system of claim 1 wherein said control module is configured to increase a length of a period between fuel reduction states of a fuel cutoff signal when said vehicle speed signal is greater than said target speed.

9. The vehicle control system of claim 1 wherein said control module is configured to reduce fuel cutoff signal toggling based on said delay of said different throttle states.

10. The vehicle control system of claim 1 further comprising a throttle position sensor configured to generate a throttle position signal,
wherein said control module is configured to:
generate a fuel reduction signal; and
enable throttle intrusive cruise control when a throttle is in an idle position and said fuel reduction signal is in an ON state.

11. The vehicle control system of claim 1 wherein said control module is configured to:
generate a fuel reduction signal;
determine a vehicle distance traveled; and
disable throttle intrusive cruise control based on said fuel reduction signal and said vehicle distance traveled.

12. The vehicle control system of claim 1 wherein said control module is configured to:
perform a second comparison between said vehicle speed signal and said target speed and generates a second difference signal; and
enable throttle intrusive cruise control when said second difference signal is less than a second predetermined value.

13. The vehicle control system of claim 1 further comprising a sensor configured to generate a throttle position signal,
wherein said control module is configured to:
generate a fuel signal; and
enable throttle intrusive cruise control to modify said cruise control command signal when said throttle position signal indicates that a throttle is in an idle position and said fuel signal indicates a decrease in fuel supply to an engine.

14. A vehicle control system comprising:
a sensor configured to generate a vehicle speed signal;
a cruise control system configured to generate a cruise control command signal to maintain a vehicle at a target speed; and
a control module configured to:
compare said vehicle speed signal to said target speed;
calculate different cruise control gains; and
delay changes in a throttle position associated with said cruise control command signal (i) based on said different cruise control gains and (ii) when said vehicle speed signal is greater than said target speed,
wherein said control module is configured to detect an intrusive disable condition and disables throttle intrusive control based on said intrusive disable condition.

15. The vehicle control system of claim 14 wherein said control module is configured to:
determine state of a fuel reduction signal;
determine a vehicle distance traveled; and
disable said throttle intrusive control when (i) said fuel reduction signal is in an OFF state; and said vehicle distance traveled is greater than a threshold.

* * * * *